UNITED STATES PATENT OFFICE.

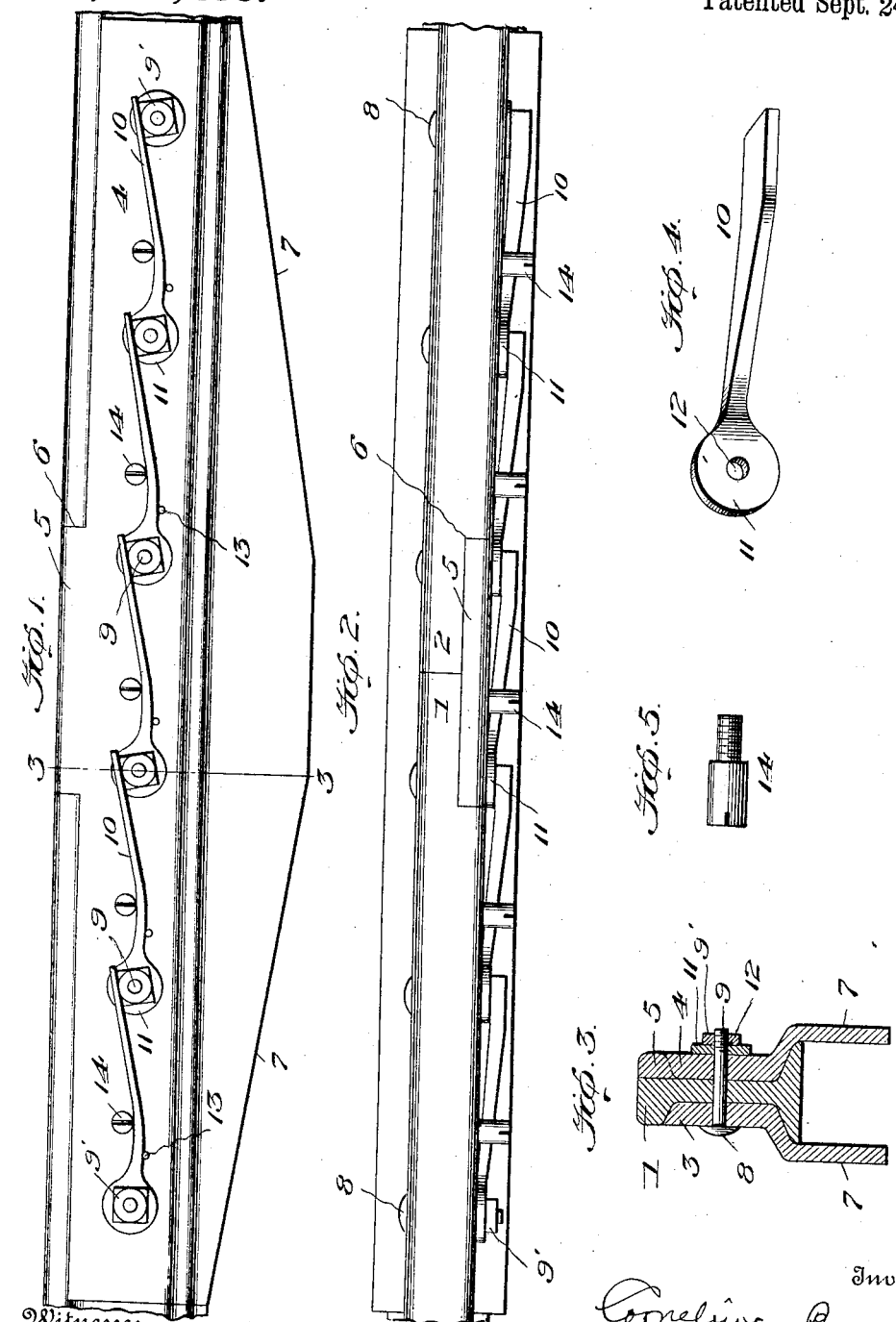

CORNELIUS BEAVER, OF SPANGLER, PENNSYLVANIA.

NUT-LOCK.

1,039,483.  Specification of Letters Patent.  Patented Sept. 24, 1912.

Application filed September 26, 1911. Serial No. 651,403.

*To all whom it may concern:*

Be it known that I, CORNELIUS BEAVER, a citizen of the United States, residing at Spangler, county of Cambria, and State of Pennsylvania, have invented certain new and useful Improvements in Nut-Locks, of which the following is a specification.

This invention relates to nut locks.

My object is to provide a nut lock particularly adapted for use on rail joints where a plurality of nuts and bolts are employed, embodying new means for locking the nuts for the several bolts in such manner that they cannot jar loose, but will permit the nuts to be independently tightened or loosened and the bolts to be removed independent of each other without disturbing the locking action on the other nuts.

My invention is set forth fully hereinafter and the novel features are recited in the appended claim.

In the accompanying drawing: Figure 1 is a side elevation; Fig. 2, a plan view; Fig. 3, a cross-section on line 3—3, Fig. 1; Fig. 4, a detail of one of the spring arms; and Fig. 5, a detail of one of the screw plugs.

The rail ends are shown at 1 and 2. One of the fish plates 3 is of ordinary construction; the other fish plate 4 is of the usual construction save that it is provided with an upward extension 5 which is received in cut-out portions 6 of the respective rails and abuts the walls of said cut-out portions, constituting a bridge or lap joint for the rail ends so that as the wheels pass from the end of one rail to the other the click or noise is deadened and minimized. Preferably the plates 3 and 4 are extended downwardly at 7 in truss form to strengthen the joint, such parts being adapted to lie against the rail base and depending vertically between adjacent ties.

The bolts which pass through the fish plates 3 and 4 are shown at 8, and the ends thereof at 9. I employ a series of springy or resilient arms 10 which have parts 11 provided with an aperture 12 through which the bolt 8 passes, the nut 9', in each instance, being screwed down against the part 11. Pins or lugs 13 project from the fish plate 4 and bear against the parts 11, in each instance and above the spring arms 10 are removable screw plugs 14 which bear on the spring arms and hold their free ends in engagement with the nuts. On taking out any plug 14, the spring arm against which it bears may be released from the nut with which the spring arm is engaged to thereby permit unscrewing of the nut without disturbing any of the other nuts or the locking action of the remaining spring arms. The spring arms 10 are of such resiliency that on applying a wrench of sufficient force to any nut, the arm will yield to permit the nut to be tightened without having to remove the plug 14 and thus, due to wear, the nuts may be readily tightened without having to take out the plugs 14, but when repairs become necessary, any arm 10 can be readily swung back after removing the plug 14 which holds it.

Having thus described my invention, what I claim as new and desire to secure by Letters Patent, is:—

In a nut lock for rail joints, the combination with rail ends, fish plates, bolts and nuts of usual construction connecting the fish plates, of springy or resilient arms through which the bolts loosely pass, said arms having resilient parts bearing against nuts adjacent to those to which they are secured, and independent pins on the fish plate which engage opposite sides of the arms to hold them against swinging movement, one of said members bearing on the spring arm, in each instance, and being removable to permit the arm to be swung without disturbing the nuts which secure the arms.

In testimony whereof, I hereunto affix my signature in presence of two witnesses.

CORNELIUS BEAVER.

Witnesses:
I. N. RODKEY,
ZOLA RODKEY.

Copies of this patent may be obtained for five cents each, by addressing the "Commissioner of Patents, Washington, D. C."